(12) United States Patent
Karlsson et al.

(10) Patent No.: US 8,406,254 B2
(45) Date of Patent: Mar. 26, 2013

(54) NETWORK OPTIMIZED DISTRIBUTION

(75) Inventors: Kent Karlsson, San Francisco, CA (US);
Ola Hällmarker, Hägersten (SE);
Martin Linderoth, Årsta (SE); Dag Henriksson, Spänga (SE)

(73) Assignee: MobiTV, Inc., Emeryville, CA (US)

( * ) Notice: Subject to any disclaimer, the term of this patent is extended or adjusted under 35 U.S.C. 154(b) by 948 days.

(21) Appl. No.: 12/101,905

(22) Filed: Apr. 11, 2008

(65) Prior Publication Data
US 2009/0260045 A1 Oct. 15, 2009

(51) Int. Cl.
*H04J 3/16* (2006.01)
(52) U.S. Cl. .......................................... 370/468; 725/93
(58) Field of Classification Search .................. 370/389, 370/537, 350, 487, 468; 368/201; 706/47; 725/93
See application file for complete search history.

(56) References Cited

U.S. PATENT DOCUMENTS

| | | | | |
|---|---|---|---|---|
| 5,184,347 | A | * | 2/1993 | Farwell et al. ................ 370/350 |
| 6,169,843 | B1 | * | 1/2001 | Lenihan et al. ............... 386/201 |
| 6,598,034 | B1 | * | 7/2003 | Kloth .............................. 706/47 |
| 6,754,241 | B1 | * | 6/2004 | Krishnamurthy et al. ..... 370/537 |
| 7,333,515 | B1 | * | 2/2008 | Ramakrishnan et al. ..... 370/487 |
| 7,643,480 | B2 | * | 1/2010 | Liu et al. ........................ 370/389 |

* cited by examiner

*Primary Examiner* — Mark Rinehart
*Assistant Examiner* — Gbemileke Onamuti
(74) *Attorney, Agent, or Firm* — Kwan & Olynick LLP

(57) ABSTRACT

A content server is configured to buffer and transmit numerous live media streams to individual devices. The content server analyzes characteristics associated with the live media streams to determine timing and sequence number information. Other characteristics such as network congestion metrics, device buffer usage metrics, etc., can also be evaluated. Combined peak transmission times are determined to allow packets designated for transmission at a bandwidth usage peak to be transmitted earlier in time. Earlier packets are shifted even earlier as sequence numbers allow. This evens out bandwidth usage rates and allows improved live media stream transmission.

23 Claims, 8 Drawing Sheets

| RTP Packet Stream 301 | | | | | | | | | | | | | | | | |
|---|---|---|---|---|---|---|---|---|---|---|---|---|---|---|---|---|
| Timestamp 303 | 6 | 6 | 6 | 7 | 8 | 9 | 10 | 11 | 11 | 12 | 13 | 14 | 15 | 16 | 17 | 17 |
| Sequence Number 305 | 4303 | 4304 | 4305 | 4306 | 4307 | 4308 | 4309 | 4310 | 4311 | 4312 | 4313 | 4314 | 4315 | 4316 | 4317 | 4318 |
| Marker 307 | 0 | 0 | 0 | 0 | 0 | 0 | 0 | 0 | 0 | 0 | 0 | 0 | 0 | 0 | 0 | 0 |
| Data Frame 309 | I | I | I | P | B | P | P | I | I | P | P | B | P | B | I | I |

Figure 3

NETWORK OPTIMIZED DISTRIBUTION

TECHNICAL FIELD

The present disclosure relates to managing media stream transmission bit rates.

DESCRIPTION OF RELATED ART

Protocols such as the Real-Time Transport Protocol (RTP) are used to transport video and audio data over networks. A separate session is used to carry each content stream such as a video or audio stream. RTP specifies a standard packet format that is used to carry video and audio data such as Moving Pictures Expert Group (MPEG) video data including MPEG-2 and MPEG-4 video frames. In many instances, multiple frames are included in a single RTP packet. The MPEG frames themselves may be reference frames or may be frames encoded relative to a reference frame.

Conventional techniques and mechanisms allow a content server to transmit a media stream to a client device such as a mobile device. However, mechanisms for transmitting streams efficiently and effectively are limited. Consequently, it is desirable to provide improved techniques and mechanisms for transmitting media streams from content servers to client devices.

BRIEF DESCRIPTION OF THE DRAWINGS

The disclosure may best be understood by reference to the following description taken in conjunction with the accompanying drawings, which illustrate particular embodiments.

FIG. 3 illustrates one example of an RTP stream.

DESCRIPTION OF EXAMPLE EMBODIMENTS

Figure 1:
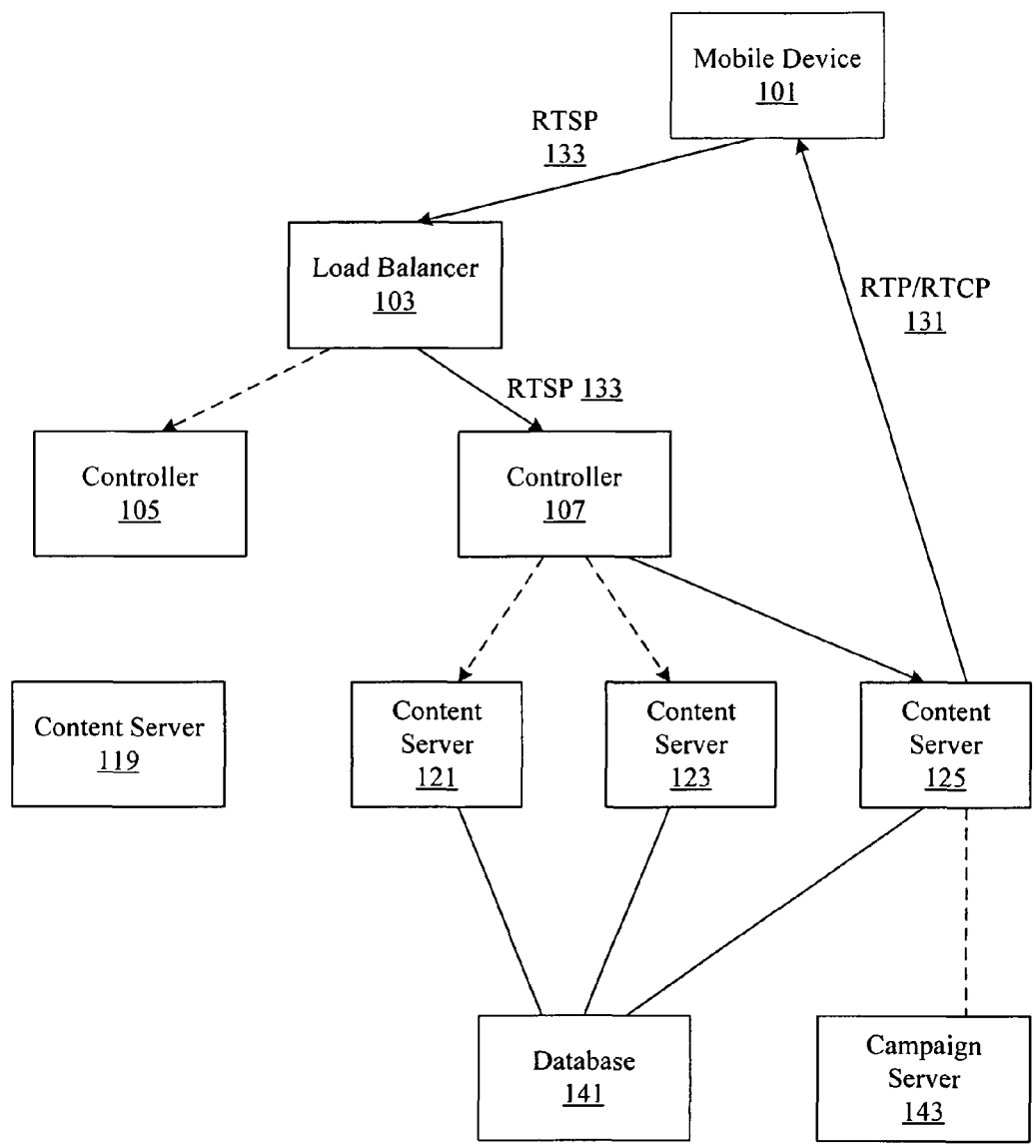
FIG. 1 illustrates an exemplary system for use with embodiments of the present invention.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of the Real-Time Transport Protocol (RTP) and the Real-Time Streaming Protocol (RTSP). However, it should be noted that the techniques of the present invention apply to a variations of RTP and RTSP. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

A content server is configured to buffer and transmit numerous live media streams to individual devices. The content server analyzes characteristics associated with the live media streams to determine timing and sequence number information. Other characteristics such as network congestion metrics, device buffer usage metrics, etc., can also be evaluated. Combined peak transmission times are determined to allow packets designated for transmission at a bandwidth usage peak to be transmitted earlier in time. Earlier packets are shifted even earlier as sequence numbers allow. This evens out bandwidth usage rates and allows improved live media stream transmission.

Example Embodiments

A variety of mechanisms are used to deliver media streams to devices. In particular examples, a client establishes a session such as a Real-Time Streaming Protocol (RTSP) session. A server computer receives a connection for a media stream, establishes a session, and provides a media stream to a client device. The media stream includes packets encapsulating frames such as Moving Pictures Expert Group (MPEG) frames. The MPEG frames themselves may be key frames or differential frames. The specific encapsulation methodology used by the server depends on the type of content, the format of that content, the format of the payload, the application and transmission protocols being used to send the data. After the client device receives the media stream, the client device decapsulates the packets to obtain the MPEG frames and decodes the MPEG frames to obtain the actual media data.

In many instances, a server computer obtains media data from a variety of sources, such as media libraries, cable providers, satellite providers, and processes the media data into MPEG frames such as MPEG-2 or MPEG-4 frames. In particular examples, a server computer may encode six media streams of varying bit rates for a particular channel for distribution to a variety of disparate devices.

RTSP sessions generally provide variable bit rate transmission to provide a relatively good quality stream given bandwidth constraints. Variable bit rate is not optimal in an IP network due to bandwidth peaks and spikes. Peaks and spikes can cause problems particularly when the stream has to pass through bandwidth limited network devices. These high usage time periods can cause packet delays or packet drops.

For a content server transmitting live media streams to numerous devices, the peaks and spikes can be particularly pronounced. For example, thousands of viewers may simultaneously request a particular channel at a particular time slot because of a scheduled program.

In some examples, peaks in a particular media stream are magnified due to simultaneous transmission of the media stream to thousands of devices. Consequently, the techniques and mechanisms of the present invention allow a content server to intelligently analyze characteristics of numerous media streams buffer for transmission. In some instances, characteristics of numerous live media streams and network congestion metrics are analyzed to smooth peaks and spikes in the usage of bandwidth. Content servers typically buffer at least a few seconds of live media streams and can look at timing information in the buffered media stream packets in order to determine when potential transmission peaks will occur. In particular embodiments, the content server can determine the rate of transmission, the amount of data to be transmitted, the network conditions, etc. According to various embodiments, the content server can then smooth transmission bit rates by making a variable bit rate stream resemble more of a fixed bit rate stream.

Packets for transmission at peak transmission time t2 are transmitted early at time t1. Packets for transmission at time t1 are transmitted early at time t0 as sequence numbers allow. Sequence numbers are maintained so that live stream packets arrive as expected at a client device. Sequence information is also maintained and/or modified to allow seamless client device operation. Timing and sequence information in an RTP stream is preserved. A client device can not distinguish between a live stream modified by a content server and an original live stream.

FIG. 1 is a diagrammatic representation illustrating one example of a system that can use the techniques and mechanisms of the present invention. According to various embodiments, content servers 119, 121, 123, and 125 are configured to provide media content to a mobile device 101 using protocols such as RTP and RTCP. Although a mobile device 101 is shown, it should be recognized that other devices such as set top boxes and computer systems can also be used. In particular examples, the content servers 119, 121, 123, and 125 can themselves establish sessions with mobile devices and stream video and audio content to mobile devices. However, it is recognized that in many instances, a separate controller such as controller 105 or controller 107 can be used to perform session management using a protocol such as RTSP. It is recognized that content servers require the bulk of the processing power and resources used to provide media content mobile devices. Session management itself may include far fewer transactions. Consequently, a controller can handle a far larger number of mobile devices than a content server can. In some examples, a content server can operate simultaneously with thousands of mobile devices, while a controller performing session management can manage millions of mobile devices simultaneously.

By separating out content streaming and session management functions, a controller can select a content server geographically close to a mobile device 101. It is also easier to scale, as content servers and controllers can simply be added as needed without disrupting system operation. A load balancer 103 can provide further efficiency during session management using RTSP 133 by selecting a controller with low latency and high throughput.

According to various embodiments, the content servers 119, 121, 123, and 125 have access to a campaign server 143. The campaign server 143 provides profile information for various mobile devices 101. In some examples, the campaign server 143 is itself a content server or a controller. The campaign server 143 can receive information from external sources such as mobile device 101. The information can be profile information associated with various users of the mobile device including interests and background. The campaign server 143 can also monitor the activity of various devices to gather information about the devices. The content servers 119, 121, 123, and 125 can obtain information about the various devices from the campaign server 143. In particular examples, a content server 125 uses the campaign server 143 to determine what type of media clips a user on a mobile device 101 would be interested in viewing.

According to various embodiments, the content servers 119, 121, 123, and 125 are also receiving media streams from content providers such as satellite providers or cable providers and sending the streams to devices using RTP 131. In particular examples, content servers 119, 121, 123, and 125 access database 141 to obtain desired content that can be used to supplement streams from satellite and cable providers. In one example, a mobile device 101 requests a particular stream. A controller 107 establishes a session with the mobile device 101 and the content server 125 begins streaming the content to the mobile device 101 using RTP 131. In particular examples, the content server 125 obtains profile information from campaign server 143.

In some examples, the content server 125 can also obtain profile information from other sources, such as from the mobile device 101 itself. Using the profile information, the content server can determine whether a client device would support a burst of data. For example, the content server could determine that the client device has a particular buffer size and reports when the buffer is low or empty. When the client device supports buffer bursts, the content server can transmit available data at a higher bit rate to the client device when the client buffer is low or empty. In some instances, a content server buffer for a particular channel will be empty and nothing can be transmitted to the client. However, if the content server buffer for the particular channel has data available, a burst of data can be transmitted to replenish the client buffer. In a particular example, 8 seconds of video data is transmitted in a short amount of time. Extra packets can simply be transmitted. However, a lower quality stream selected from the same channel or from a database can also be transmitted to replenish the client buffer.

Figure 2:
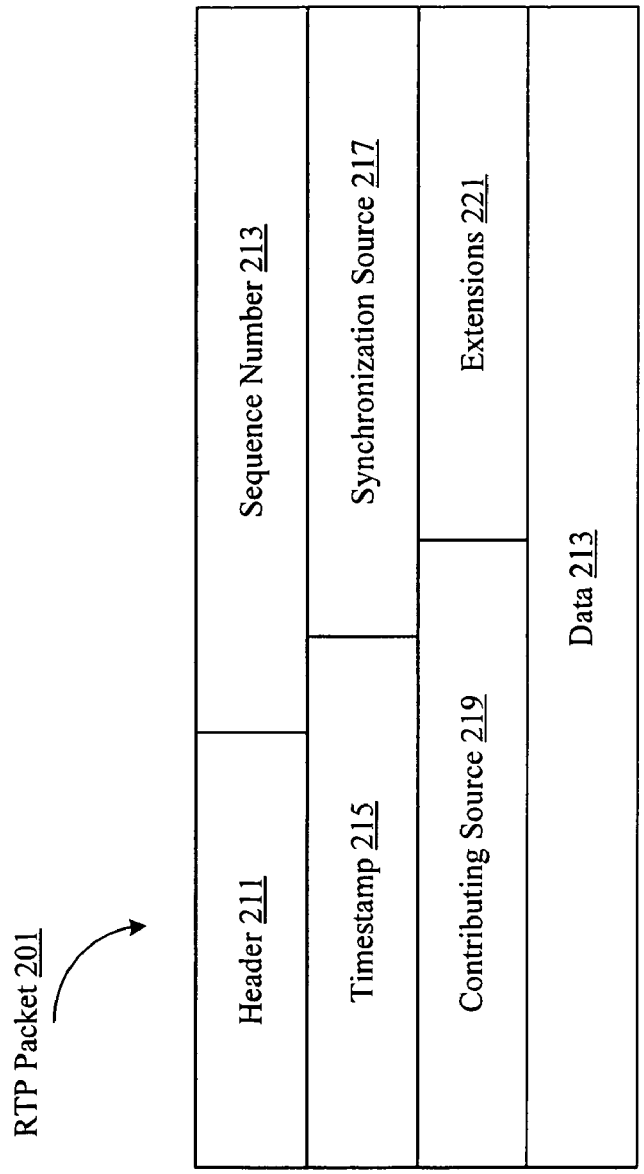
FIG. 2 illustrates one example of a Real-Time Transport Protocol (RTP) packet.

FIG. 2 illustrates one example of an RTP packet. An RTP packet 201 includes a header 211. According to various embodiments, the header 211 includes information such as the version number, amount of padding, protocol extensions, application level, payload format, etc. The RTP packet 201 also includes a sequence number 213. Client applications receiving RTP packets expect that the sequence numbers for received packets be unique. If different packets have the same sequence number, erroneous operation can occur. RTP packets also have a timestamp 215 that allows jitter and synchronization calculations. Fields 217 and 219 identify the synchronization source and the contributing source. Extensions are provided in field 221.

According to various embodiments, data 231 holds actual media data such as MPEG frames. In some examples, a single RTP packet 201 holds a single MPEG frame. In many instances, many RTP packets are required to hold a single MPEG frame. In instances where multiple RTP packets are required for a single MPEG frame, the sequence numbers change across RTP packets while the timestamp 215 remains the same across the different RTP packets. Different MPEG frames include I-frames, P-frames, and B-frames. I-frames are intraframes coded completely by itself. P-frames are predicted frames which require information from a previous I-frame or P-frame. B-frames are bi-directionally predicted frames that require information from surrounding I-frames and P-frames.

Because different MPEG frames require different numbers of RTP packets for transmission, two different streams of the same time duration may require different numbers of RTP packets for transmission. Simply replacing a clip with another clip would not work, as the clips may have different numbers of RTP packets and having different impacts on the sequence numbers of subsequent packets.

FIG. 3 illustrates one example of an RTP packet stream. An RTP packet stream 301 includes individual packets having a variety of fields and payload data. According to various embodiments, the fields include a timestamp 303, sequence 505, marker 307, etc. The packets also include payload data 309 holding MPEG frames such as I, P, and B-frames. Timestamps for different packets may be the same. In particular examples, several packets carrying portions of the same I-frame have the same time stamp. However, sequence numbers are different for each packet. Marker bits 307 can be used for different purposes, such as signaling the starting point of an advertisement.

According to various embodiments, packets with sequence numbers 4303, 4304, and 4305 carrying potions of the same I-frame and have the same timestamp of 6. Packets with sequence numbers 4306, 4307, 4308, and 4309 carry P, B, P, and P-frames and have timestamps of 7, 8, 9, and 10 respectively. Packets with sequence numbers 4310 and 4311 carry different portions of the same I-frame and both have the same timestamp of 11. Packets with sequence numbers 4312, 4313, 4314, 4315, and 4316 carry P, P, B, P, and B-frames respectively and have timestamps 12, 13, 14, 15, and 16. It should be noted that the timestamps shown in FIG. 3 are merely representational. Actual timestamps can be computed using a variety of mechanisms.

For many audio encodings, the timestamp is incremented by the packetization interval multiplied by the sampling rate. For example, for audio packets having 20 ms of audio sampled at 8,000 Hz, the timestamp for each block of audio increases by 160. The actual sampling rate may also differ slightly from this nominal rate. For many video encodings, the timestamps generated depend on whether the application can determine the frame number. If the application can determine the frame number, the timestamp is governed by the nominal frame rate. Thus, for a 30 f/s video, timestamps would increase by 3,000 for each frame. If a frame is transmitted as several RTP packets, these packets would all bear the same timestamp. If the frame number cannot be determined or if frames are sampled a periodically, as is typically the case for software codecs, the timestamp may be computed from the system clock While the timestamp is used by a receiver to place the incoming media data in the correct timing order and provide playout delay compensation, the sequence numbers are used to detect loss. Sequence numbers increase by one for each RTP packet transmitted, timestamps increase by the time "covered" by a packet. For video formats where a video frame is split across several RTP packets, several packets may have the same timestamp. For example, packets with sequence numbers 4317 and 4318 have the same timestamp 17 and carry portions of the same I-frame.

Figure 4:
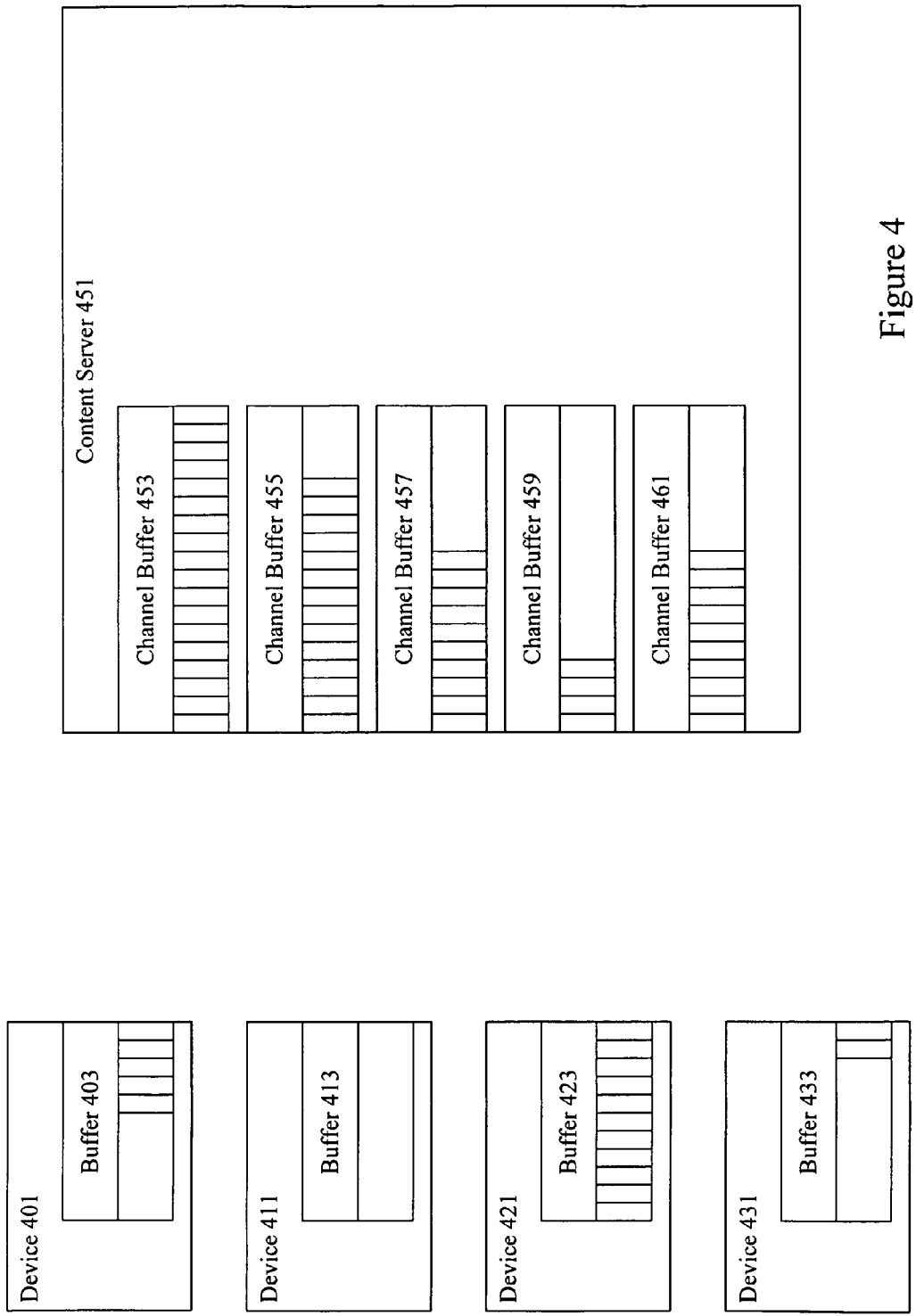
FIG. 4 illustrates one example of system that can use bit rate control.

FIG. 4 illustrates one example of content server buffers. According to various embodiments, devices 401, 411, 421, and 431 have individual buffers 403, 413, 423, and 433. Content server 451 includes channel buffers 453, 455, 457, 459, and 461. In particular embodiments, a content server 451 detects that a device has little or no data remaining in a buffer. A device such as a mobile device may have little or no data in a buffer when network conditions cause transmission delays and drop packets or when a device initially requests a media stream. To improve user experience, a content server 451 bursts available data for a requested stream to a device 411 having an low or empty buffer. In some examples, the content server 451 transmits data from channel buffer 455 to device 411 at double the usual transmission bit rate for a fixed number of seconds.

In other examples, the content server 451 transmits data from a low quality stream in channel buffer 453 to device 411. Transmitting a lower quality stream allows a buffer to be filled while maintaining the same transmission bit rate. For example, a stream in channel buffer 453 may be a 50 mbps stream while a stream in channel buffer 455 may be a 100 mbps stream. More frames from the lower quality stream can be transmitted to allow the device 411 to resume playback with decreased delay.

According to various embodiments, content server buffers may or may not be prefilled. In some examples, once a media stream has been requested, the corresponding channel buffer is filled at the content server. However, channel buffers corresponding to media streams not yet requested are typically not prefilled or prewarmed. Playback can be delayed while the content server channel buffers are filled. Consequently, the techniques and mechanisms of the present invention contemplate prefilling channel buffers. According to various embodiments, the content server channel buffers are prefilled using live streams from cable and satellite providers and continually refreshed with the most recent streaming data. In some instances, all channel buffers are prefilled. In other instances, selected channel buffers are prefilled and refreshed using satellite and cable media streams.

Figure 5:
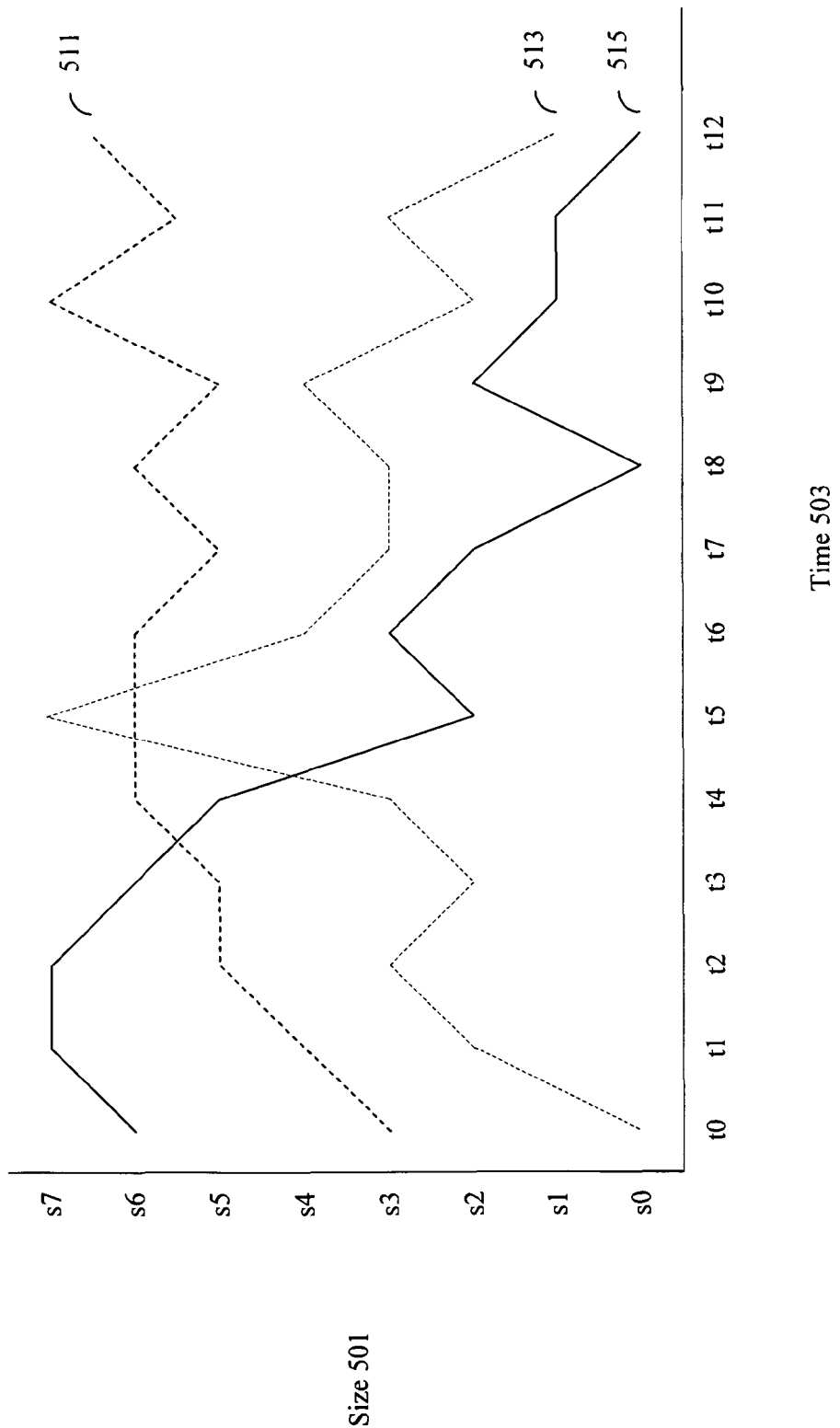
FIG. 5 illustrates transmission bit rates for various devices.

FIG. 5 illustrates one example of bandwidth usage for multiple media streams. A graphical representation illustrates one example of bandwidth usage for particular media streams associated with lines 511, 513, and 515. For example, at times t0 to t12, a content server will be transmitting data sizes between s0 and s7. In particular embodiments, a content server buffers a live stream prior to transmitting a live stream to individual devices. For example, a content may buffer between six seconds and two days worth of a live stream. An RTP packet stream includes individual packets having a variety of fields and payload data. According to various embodiments, the fields include a timestamp, sequence number, marker, etc. The packets also include payload data holding MPEG frames such as I, P, and B-frames. Timestamps for different packets may be the same. In particular examples, several packets carrying portions of the same I-frame have the same time stamp. However, sequence numbers are different for each packet.

According to various embodiments, a content server can simply transmit packets as they become available. In other examples, the content server may transmit packets as new packets are received from a cable or satellite provider and packets are removed from a channel buffer. In still other examples, the content server may transmit based on timing information included in the packets. Transmitting using one of these mechanisms may lead to bandwidth usage peaks however. For example, at time t5, the content server will be transmitting a large amount of data. In many implementations, some of the data may be delayed based on the burst or even dropped in a network. This leads to a suboptimal user experience, as a media stream may be disrupted or delayed.

Consequently, the content server examines bandwidth usage characteristics for combined media stream transmissions. For example, if it is determined that a large amount of bandwidth is required at time t2, some of the packets at t2 are transmitted at t1. According to various embodiments, the packets are transmitted earlier in time. Sequence numbers are adhered to allow in order delivery. In some examples, the packets at t1 are transmitted at t0 to allow further bandwidth usage averaging. According to various embodiments, this operation is uniquely performed at a content server because the content server has information about individual live media streams and has the ability to adjust transmission times of individual packets.

Figure 6:
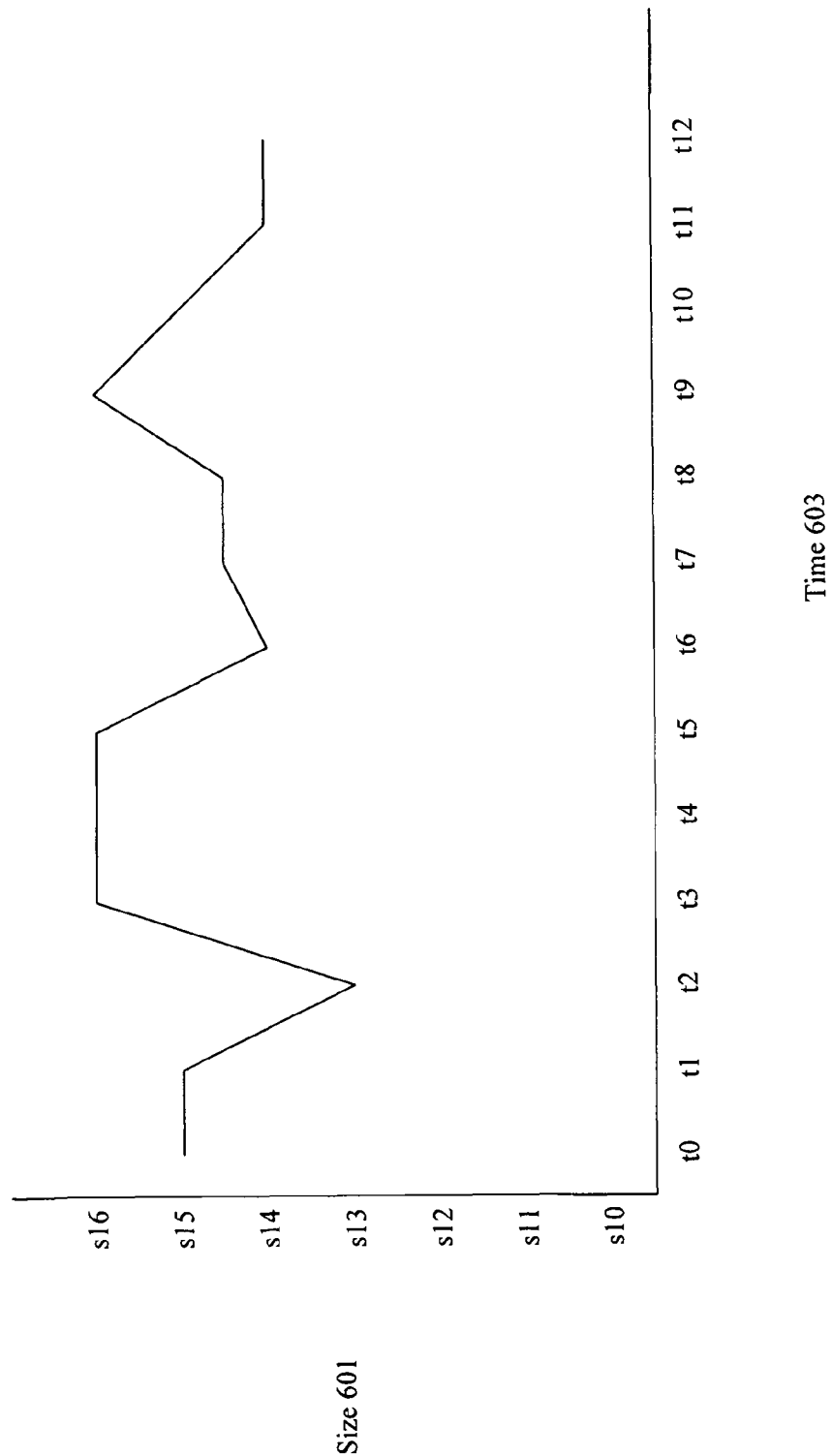
FIG. 6 illustrates transmission bit rates across numerous devices.

FIG. 6 illustrates one example of a mechanism for performing bit rate control. A graphical representation illustrates one example of bandwidth usage for combined media streams for transmission at a content server. For example, at times t0 to t12, a content server will be transmitting data sizes between s10 and s17 for all media streams. According to various embodiments, aggregate bandwidth usage for the plurality of media streams is determined along with aggregate bandwidth usage peaks. In particular embodiments, a content server buffers live streams prior to transmitting live streams to thousands of individual devices. For example, a content may buffer between six seconds and two days worth of live streams for selected channels. An RTP packet stream includes individual packets having a variety of fields and payload data. According to various embodiments, the fields include a timestamp, sequence number, marker, etc. The packets also include payload data holding MPEG frames such as I, P, and B-frames. Timestamps for different packets may be the same. In particular examples, several packets carrying portions of the same I-frame have the same time stamp. However, sequence numbers are different for each packet.

According to various embodiments, a content server recognizes at bandwidth usage peak at time t5 and moves packets for transmission at time t5 to times t4 and t3. In particular embodiments, packet transmission times are adjusted based on network congestion characteristics and transmission characteristics at a content server. According to various embodiments, packets are transmitted earlier when sequence numbers allow. In many instances, packets configured for transmission at earlier times are transmitted even earlier to allow for more packet transmission smoothing. In particular embodiments, timing information and sequence number information is maintained so that a client device can receive the media stream without modifying any client operation. According to various embodiments, the client device simply determines that some packets have been received early.

In particular embodiments, a content server is transmitting packets at t0, t1, t2 and recognizes that a bandwidth usage peak occurs at t5. The content server smooths bandwidth usage by shifting some packets designated for transmission at t4 to transmission at t3. Packets designated for transmission at t5 are shifted to transmission at t4. Consequently, transmissions at times t3, t4, and t5 all have size s4. In some examples, bandwidth usage peaks are identified as any abnormally high bandwidth usage or any local maximum bandwidth usage. In other examples, a bandwidth usage peak is identified as any bandwidth usage rate that exceeds a predetermined rate.

Although packets are typically shifted for transmission earlier in time, it should be recognized that some packets can also be shifted for later transmission. Smoothing bandwidth usage allows more even network resource usage and decreases the likelihood that packets will be dropped.

Figure 7:
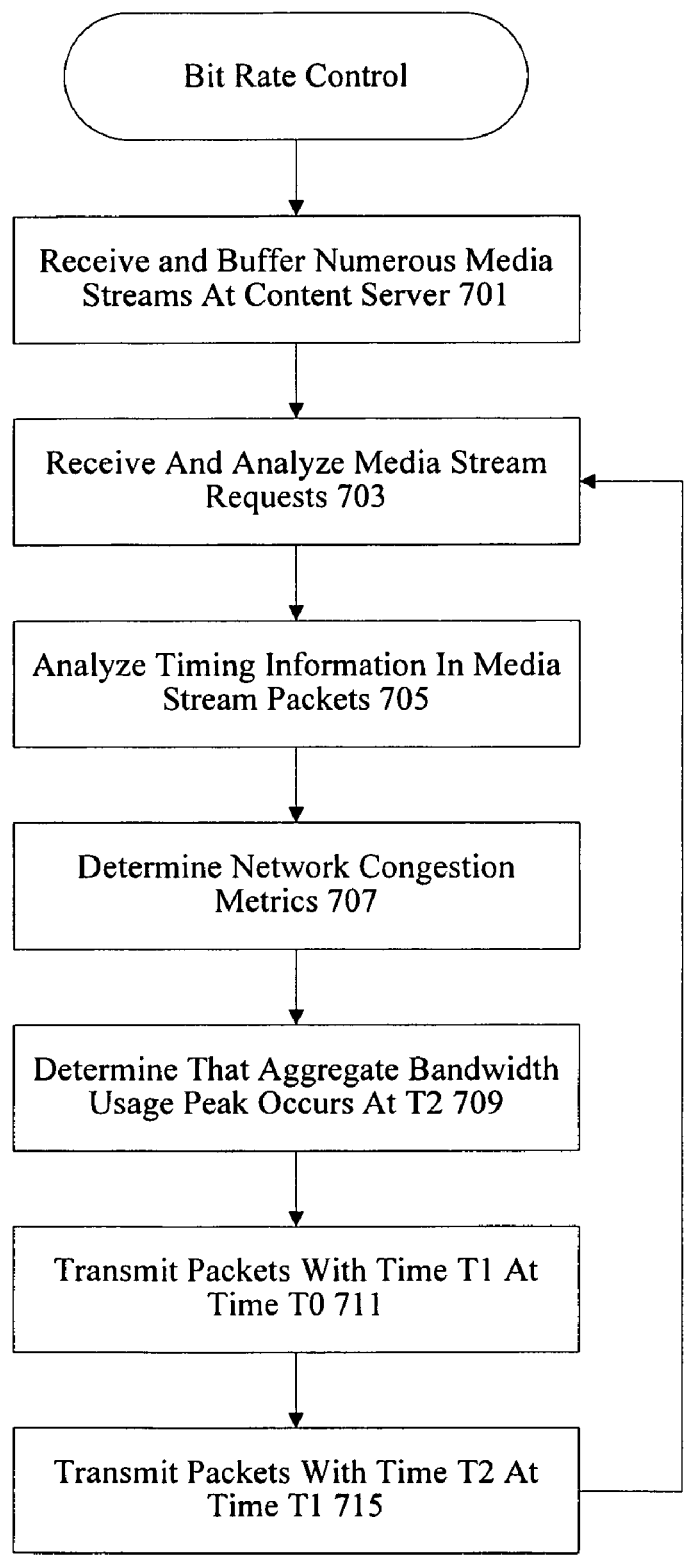
FIG. 7 illustrates one example of a technique for performing network optimized distribution.

FIG. 7 illustrates one technique for performing bit rate control. According to various embodiments, numerous media streams are received and buffered at a content server at 701. In particular embodiments, the media streams are live media streams from a cable or satellite provider. In some examples, multiple media streams are buffered. At 703, media stream requests are monitored. In some examples, numerous requests for the same media stream may be received and associated bandwidth peaks may be determined.

At 705, timing and sequence information included in the packets in the media stream are analyzed to determine bandwidth usage characteristics such as bandwidth usage peaks. In some examples, peaks may correspond to I-frames that often require a large number of packets to transmit. At 707, network congestion metrics can also be evaluated to determine what packets to shift. At 709, it is determined that a bandwidth usage peak occurs at time t2. Consequently, transmission are smoothed by moving packets with time t1 to transmission at time t0. At 711, some or all of the packets at time t1 are moved to transmission at time t0. This allows shifting of some or all of the packets designated with time t2 to transmission at time t1 at 715. Sequence numbers are maintained so that packets with earlier sequence numbers are transmitted before packets with later sequence numbers.

Figure 8:
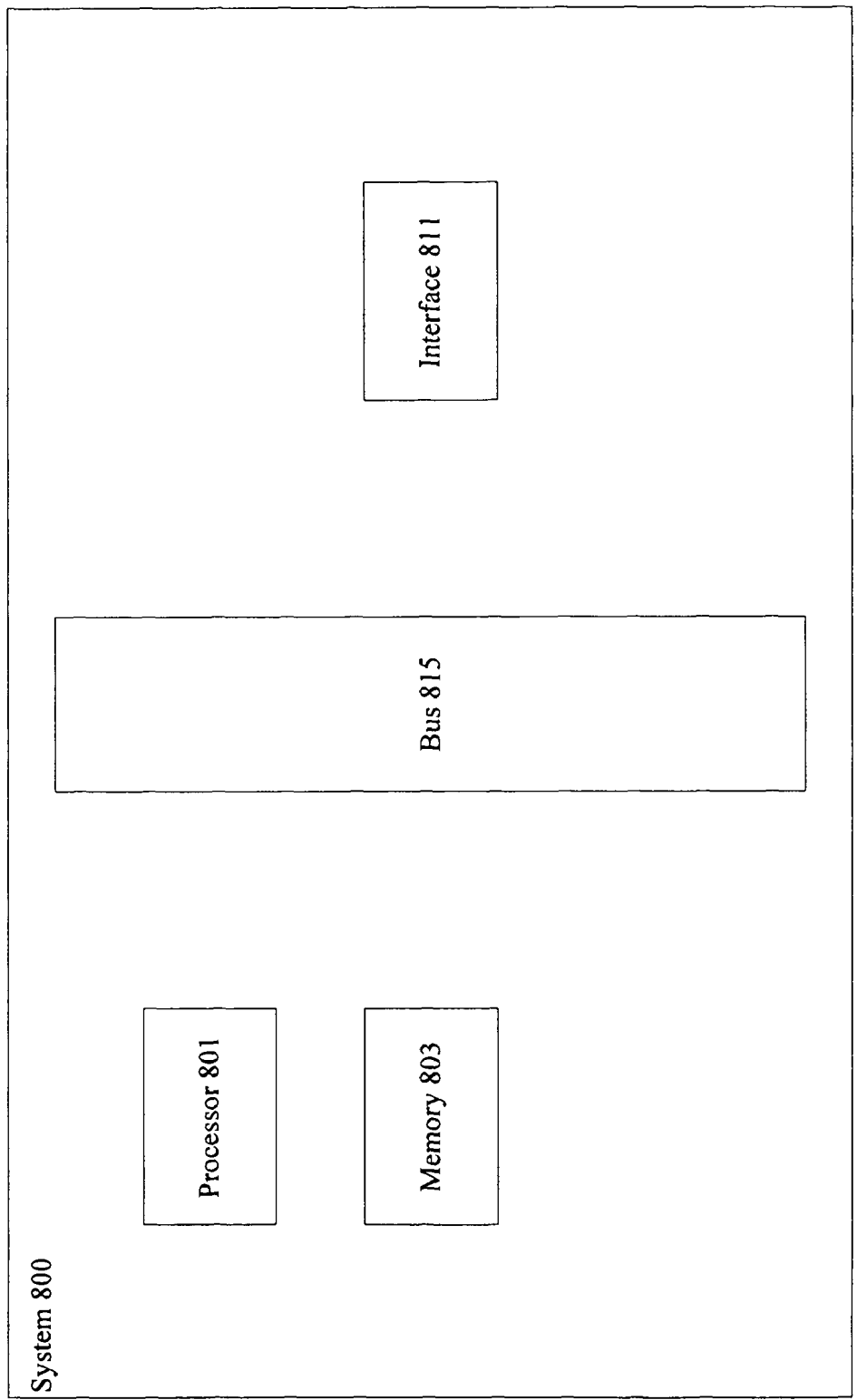
FIG. 8 illustrates one example of a system for processing media streams.

FIG. 8 illustrates one example of a content server. According to particular embodiments, a system 800 suitable for implementing particular embodiments of the present invention includes a processor 801, a memory 803, an interface 811, and a bus 815 (e.g., a PCI bus or other interconnection fabric) and operates as a streaming server. When acting under the control of appropriate software or firmware, the processor 801 is responsible for modifying and transmitting live media data to a client. Various specially configured devices can also be used in place of a processor 801 or in addition to processor 801. The interface 811 is typically configured to end and receive data packets or data segments over a network.

Particular examples of interfaces supports include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to various embodiments, the system 800 is a content server that also includes a transceiver, streaming buffers, and a program guide database. The content server may also be associated with subscription management, logging and report generation, and monitoring capabilities. In particular embodiments, functionality for allowing operation with mobile devices such as cellular phones operating in a particular cellular network and providing subscription management. According to various embodiments, an authentication module verifies the identity of devices including mobile devices. A logging and report generation module tracks mobile device requests and associated responses. A monitor system allows an administrator to view usage patterns and system availability. According to various embodiments, the content server 891 handles requests and responses for media content related transactions while a separate streaming server provides the actual media streams.

Although a particular content server 891 is described, it should be recognized that a variety of alternative configurations are possible. For example, some modules such as a report and logging module 853 and a monitor 851 may not be needed on every server. Alternatively, the modules may be implemented on another device connected to the server. In another example, the server 891 may not include an interface to an abstract buy engine and may in fact include the abstract buy engine itself. A variety of configurations are possible.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A method, comprising:
   receiving a plurality of live media streams at a content server;
   buffering the plurality of live media streams, the plurality of live media streams including a plurality of packets having timing information and sequence number information;
   determining aggregate bandwidth usage for the plurality of live media streams at time t0, time t1, and time t2, wherein each of the plurality of live media streams, including time t0 packets, time t1 packets, and time t2 packets, is requested by a plurality of users for playback at a scheduled time corresponding to live presentation;
   determining an aggregate bandwidth usage peak for the plurality of live media streams, wherein an aggregate bandwidth usage peak for the plurality of live media streams is identified at time t2;
   transmitting time t1 packets at time t0 and a portion of the time t2 packets at time t1, wherein the remaining time t2 packets are transmitted at time t2.

2. The method of claim 1, wherein a plurality of bandwidth usage peaks are determined.

3. The method of claim 1, wherein network congestion characteristics are also determined and used along with aggregate bandwidth usage peak information to determine transmission times.

4. The method of claim 1, wherein a device receiving a live media stream uses the timing information and sequence number information to decode the live media stream for playback.

5. The method of claim 1, wherein all time t1 packets are transmitted at time t0.

6. The method of claim 1, wherein time t0 packets are configured for playback before time t1 packets and time t2 packets.

7. The method of claim 1, wherein time t0 packets are configured for playback after time t1 packets and time t2 packets.

8. The method of claim 1, wherein the plurality of live media streams are buffered in a plurality of channel buffers.

9. The method of claim 1, wherein the plurality of live media streams are Real-Time Transport Protocol (RTP) streams.

10. The method of claim 1, wherein the content server is connected over a network to a controller operable to establish a session with a device using a Real-Time Streaming Protocol (RTSP).

11. The method of claim 1, wherein the plurality of live media streams comprise a plurality of packets holding I-frames, P-frames, and B-frames.

12. A system, comprising:
    an interface operable to receive a plurality of live media streams at a content server;
    a buffer operable to hold the plurality of live media streams, the plurality of live media streams including a plurality of packets having timing information and sequence number information;
    a processor operable to determine aggregate bandwidth usage for the plurality of live media streams at time t0, time t1, and time t2 and determine an aggregate bandwidth usage peak for the plurality of live media streams, wherein each of the plurality of live media streams, including time t0 packets, time t1 packets, and time t2 packets, is requested by a plurality of users for playback at a scheduled time corresponding to live presentation, wherein an aggregate bandwidth usage peak for the plurality of live media streams is identified at time t2;
    wherein the interface is operable to transmit time t1 packets at time t0 and a portion of the time t2 packets at time t1, wherein the remaining time t2 packets are transmitted at time t2.

13. The system of claim 12, wherein a plurality of bandwidth usage peaks are determined 14. The system of claim 12, wherein network congestion characteristics are also determined and used along with aggregate bandwidth usage peak information to determine transmission times.

15. The system of claim 12, wherein a device receiving a live media stream uses the timing information and sequence number information to decode the live media stream for playback.

16. The system of claim 12, wherein all time t1 packets are transmitted at time t0.

17. The system of claim 12, wherein time t0 packets are configured for playback before time t1 packets and time t2 packets.

18. The system of claim 12, wherein time t0 packets are configured for playback after time t1 packets and time t2 packets.

19. The system of claim 12, wherein the plurality of live media streams are buffered in a plurality of channel buffers.

20. The system of claim 12, wherein the plurality of live media streams are Real-Time Transport Protocol (RTP) streams.

21. The system of claim 12, wherein the content server is connected over a network to a controller operable to establish a session with a device using a Real-Time Streaming Protocol (RTSP).

22. The system of claim 12, wherein the plurality of live media streams comprise a plurality of packets holding I-frames, P-frames, and B-frames.

23. An apparatus, comprising:
    means for receiving a plurality of live media streams at a content server;
    means for buffering the plurality of live media streams, the plurality of live media streams including a plurality of packets having timing information and sequence number information;
    means for determining aggregate bandwidth usage for the plurality of live media streams at time t0, time t1, and time t2, wherein each of the plurality of live media streams, including time t0 packets, time t1 packets, and time t2 packets, is requested by a plurality of users for playback at a scheduled time corresponding to live presentation;
    means for determining an aggregate bandwidth usage peak for the plurality of live media streams, wherein an aggregate bandwidth usage peak for the plurality of live media streams is identified at time t2;
    means for transmitting time t1 packets at time t0 and a portion of the time t2 packets at time t1, wherein the remaining time t2 packets are transmitted at time t2.

* * * * *